United States Patent

Wunsch

[15] 3,706,888
[45] Dec. 19, 1972

[54] POSITIONING DEVICE FOR THE RADIATION ABSORBER OF THICKNESS MEASURING DEVICES

[72] Inventor: Bruno Wunsch, New York, N.Y.

[73] Assignee: Exatest Messtechnik GmbH, Leverkusen, Germany

[22] Filed: Sept. 28, 1970

[21] Appl. No.: 75,929

[30] Foreign Application Priority Data

Oct. 1, 1969 Germany ................... P 19 49 558.0

[52] U.S. Cl. ......................... 250/83.3 D, 250/86
[51] Int. Cl. ............................................. G01n 23/16
[58] Field of Search ............................ 250/83.3 D, 86

[56] References Cited

UNITED STATES PATENTS

| | | | |
|---|---|---|---|
| 3,435,220 | 3/1969 | Hanken | 250/83.3 D |
| 3,543,027 | 11/1970 | Butterworth et al. | 250/83.3 D |
| 2,936,374 | 5/1960 | Zimmer | 250/83.3 D |

*Primary Examiner*—Archie R. Borchelt
*Attorney*—William R. Sherman, Stewart F. Moore and Jerry M. Presson

[57] ABSTRACT

A radiation-type thickness measuring device has a radiation source for irradiating the object whose thickness is to be measured and a radiation detector for detecting the radiation transmitted by the object. A radiation absorber sheet is introduced into the radiation path, this sheet being of the appropriate thickness, according to the thickness of the object to be measured, to standardize the amount of radiation reaching the detector. Sheets of various thicknesses are carried circumferentially by a disk and the disk must be positioned accurately so that the correct sheet lies precisely where it should in the radiation beam. A positioning device is provided for the disk, having a bridge circuit of which two branches are formed by a potentiometer whose sliding tap is connected to the disk so that its position is dependent on the real position of the disk. The other two branches of the bridge are formed by a resistance chain whose intermediate tap can be selected in accordance with the desired position of the disk. A threshold switch in the form of a Schmitt trigger is controlled by the diagonal voltage of the bridge and controls a relay. When the diagonal voltage exceeds the threshold of the Schmitt trigger the relay connects the drive motor of the disk to a relatively high voltage source to operate the motor at a relatively high speed in the direction which reduces this diagonal voltage. When the bridge diagonal voltage falls within the threshold, the relay disconnects the motor from the high voltage source. A fine switch then takes over. This fine switch connects the motor to a relatively low voltage for driving it at a low speed. When the disk reaches its exact desired position, a cam which is connected to the disk causes the fine switch to disconnect the motor from the low voltage source so as to stop the motor.

7 Claims, 1 Drawing Figure

PATENTED DEC 19 1972 3,706,888
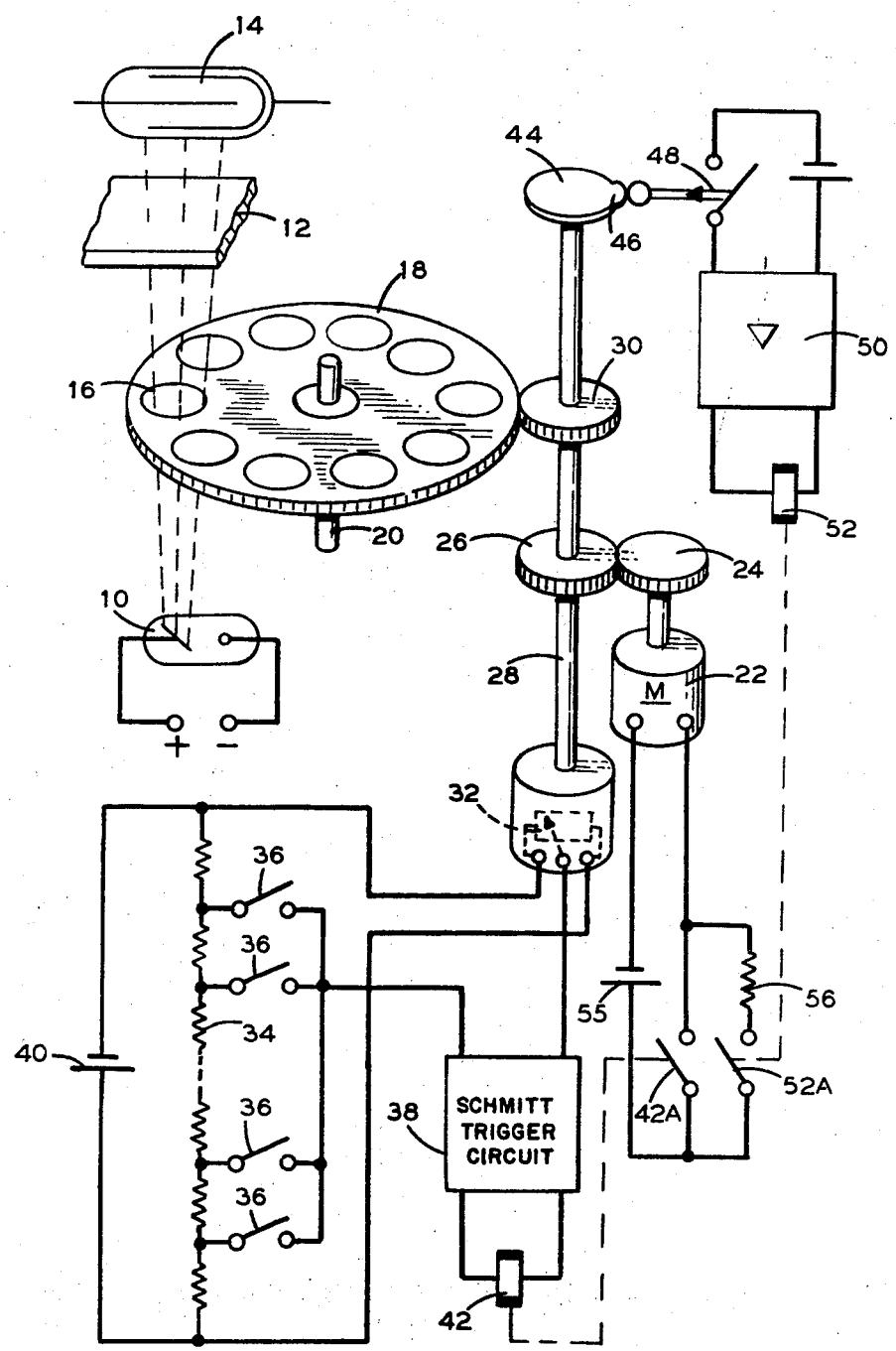
INVENTOR.
Bruno Wunsch
BY
ATTORNEY

POSITIONING DEVICE FOR THE RADIATION ABSORBER OF THICKNESS MEASURING DEVICES

This invention relates to a positioning device for a disk carrying absorber sheets in the beam path of thickness measuring devices. In such thickness measure devices the object to be measured is subjected to an X-ray or isotope radiation (gamma radiation) and the absorption corresponds to the thickness to be measured. For this purpose the radiation leaving the object is processed by means of a detector.

In order to compensate possible variations of the radiation source and possible drift of the detector and amplifier stages following the latter, it is usual practice to provide absorbers in the radiation path. By means of such absorbers the arrangement can be designed in such a manner that just such an amount of the initial radiation is absorbed that the absorption by the object to be measured will always generate a constant output signal by the detector which, thus, is continuously impinged by the same number of quanta. This simplifies the design on the side of the detector. In any case, it is necessary to make the absorber adjustable. For this purpose, it is known to provide a movable wedge as absorber which is introduced into the radiation path so that the desired number of quanta per unit time — integrated over the radiation area — will be obtained. The resulting non-linear relation between the wedge movement and the absorption is a considerable drawback because the adjustment accuracy is degraded. Therefore, another device has been developed in which sheets of different thickness are superimposed and introduced into the radiation path until the proper absorption value is obtained. The device is complicated because of the necessary transmission of information concerning the kind and number of sheets in operation.

In a further known device, so-called disk absorbers are used. These devices comprise a rotatably disposed disk provided adjacent its circumference with holes to receive absorber sheets of different thickness. Optionally, several of such disks can be superimposed wherein one disk carries absorber sheets in steps of millimeters, the second in steps of tenths of millimeters and the third in steps of hundredths of millimeters. The disks will then be turned into the beam path by a motor until the proper total thickness of the absorber sheets is obtained. The positioning is checked by means of a test signal, generated for example by a potentiometer forming two branches of a bridge circuit, while the remaining bridge branches are adjustable for generating a reference signal for determining the desired or standard position. The motor is controlled by the bridge diagonal voltage. The system is designed so that with decreasing error signal the motor revolves slower and slower and finally comes to a stop.

The device thus comprises a proportionally operating regulation loop having the known drawback that a variation occurs only as long as at least a small error signal is present. Since, however, the device must operated extremely accurately in order to properly position the absorber sheet, which has considerable size relative to the desired positioning accuracy, a very high gain must be provided in the regulating loop of this known device, which increases the expense and the danger of regulation oscillations. On the other hand, a completely digital feed back and positioning device requires the same efforts if not more.

It is the object of this invention to provide a positioning device for a disk carrying absorber sheets in the beam path of thickness measuring devices, said device having a drive motor and an analogue position indicator for the disk and further having a bridge circuit for comparing the analogue signal indicative of the actual position of the disk with an analogue reference signal which determines the desired position, said drive motor being controlled by a voltage dependent upon the bridge diagonal voltage; and which device provides extremely accurate and nevertheless quick positioning without considerable circuit effort. This problem is solved in accordance with this invention by a threshold switch controlled by the bridge diagonal voltage for connecting the motor to a first high voltage until the bridge diagonal voltage has decreased below the threshold value of said switch when the disk approximately reaches the desired position and further by a fine positioning switch for connecting the motor to a second lower voltage, this fine positioning switch being opened by an actuating member moving in synchronism with the disk, only when the disk reaches its accurate desired position.

The device according to the invention, thus, comprises a first regulating loop operating in analogue manner for the position and is insofar similar to the known devices, and comprises further a second digitally operating regulating loop which compensates completely the remaining error of the first regulating loop. Since the motor starts with a high speed and only the remaining correction occurs with a reduced speed, the device operates not only very accurately but also very quickly, since the motor is not supplied with a slowly decreasing voltage as is hitherto usual practice. It is advantageous that the threshold switch comprise a Schmitt trigger circuit fed with the bridge diagonal voltage, and provided at its output with a relay for switching the first motor voltage. The threshold value of the Schmitt trigger circuit corresponds to the angle of rotation of the disk between two successive openings of the fine switch by means of the actuating member; the threshold value of the trigger circuit must be lower than the bridge diagonal voltage at the last opening of the fine switch before the final opening which occurs at the accurate desired position. This rotation angle of the disk between two successive openings of the fine switch is just a fraction of the lateral dimension of the absorber sheet; if the actuating member were provided on the disk itself — e.g. if each absorber sheet were provided with a cam for actuating a micro switch — these would have to be manufactured with extreme accuracy and would have to be adjusted and even frequently readjusted. Therefore, it is preferred as advantageous to provide an intermediate shaft driven by the motor for transmitting the rotation to the disk and for driving the position indicator and for turning the actuating member. By proper choice of the transmission ratio it is possible that one complete turn of the disk corresponds to a multiplicity of turns of the intermediate shaft so that the actuating member can be manufactured and adjusted with less accuracy; a potentiometer having several turns can then be used as the indicator for providing signals corresponding to the instantaneous position of the disk. The actuating member can be a cam actuated micro switch, a reed contact or other magnetically operated components which are known per se.

The invention will be explained herein below in detail with reference to the accompanying drawing which shows semischematically one example of a device in accordance with the invention.

The X-ray tube 10 generates X-radiation indicated in dashed lines for measuring the thickness of a metal sheet 12. For this purpose, beyond the sheet a detector 14 is provided having amplifier and processing circuits, the latter not being shown. Within the radiation path, for reasons which have been explained above, an absorber sheet 16 is provided. The absorber sheet 16 is one of ten absorber sheets disposed on disk 18, the ten absorber sheets having different thickness. It is possible to provide multiple disks having absorber sheets but for the purpose of illustration but one disk 18 has been shown.

Disk 18 is rotatably mounted about its axial spindle 20 in order to permit the positioning of any one desired absorber sheet in the radiation path. The disk is driven in rotation by motor 22 which drives an intermediate shaft 28, via gears 24, 26, the intermediate shaft 28, in turn, carrying a gear 30, engaging the toothed circumference of disk 18.

The intermediate shaft 28 is further connected to the sliding tap of a one or multiple turn measuring potentiometer 32, the connection being also possible via gearing. The potentiometer 32 is known per se and only schematically indicated in the drawing. The tap slider and the two terminals of potentiometer 32 define two branches of a bridge circuit. The other two branches are formed by a resistance chain 34. Any one of the connecting points of the resistors in the chain 34 may be connected via a contact 36 to the input of a Schmitt trigger circuit 38. The other input of the Schmitt trigger is connected to the potentiometer tap slider. Since the position of intermediate shaft 28 exactly depends upon the position of disk 18 and since the intermediate shaft is rigidly connected to the tap of potentiometer 32, the tap position is a proper indication of the position of disk 18. Contacts 36 are actuated by relays which are manually operated or provided in the control chain of a regulating loop. The appropriate one of contacts 36 is actuated in accordance with the desired thickness of a metal sheet. Suitable devices for actuating the contacts 36 are known per se and do not form a portion of the present invention; thus, their explanation in detail can be omitted.

The bridge circuit is connected to a current source 40. Thus, in response to actuation of one of the relays which control the contact 36, a voltage signal will be developed in the bridge diagonal; this signal consequently appears at the input of the Schmitt trigger circuit 38. If the signal is above the threshold value of the Schmitt trigger, the latter will switch and thereby actuate a relay 42 connected into the output circuit of the Schmitt trigger, relay 42 closing switch contact 42a. Thereupon, motor 22 is connected to current source 55 and rotates with constant speed, thereby turning intermediate shaft 28 and therewith disk 18, the latter with reduced speed. The motor rotates with full voltage and speed as long as contact 42a is closed.

Rotation of intermediate shaft 28 or of the output shaft of gearing coupled to the shaft 28 is also transmitted to the tap slider of potentiometer 32 with the result that the voltage across the bridge diagonal is reduced. In the circuit, but one of two Schmitt trigger circuits is shown, the second Schmitt trigger will be operated upon the polarity reversal of the input signal, thereby controlling a second relay corresponding to relay 42 which, however, connects motor 22 to a voltage of reversed polarity so that the motor will turn in the other direction. However, it is possible to work with the simplified embodiment as shown, assuming that the sliding tap of the potentiometer can be turned beyond the potentiometer terminal and that an increased average positioning time is acceptable. In the latter case, the Schmitt trigger circuit must be able to be operated with voltages of different polarity and it will be possible that, with the start of the motor, the bridge diagonal voltage may at first increase and then decrease at a later moment. In both the described embodiments in any case there will be a position in which the voltage at the Schmitt trigger 38 input is no longer sufficient to keep the latter in its "On" state in which the relay 42 is actuated. Schmitt trigger 38 will then switch back, relay 42 will be disabled, and contact 42a will open. This will occur in the moment in which the correct absorber sheet is approximately in its desired position. It will, however, not yet be accurately in this position because the entire system has a certain hysteresis due to friction, inertia moments, etc., and drift must be expected in the potentiometer 32, in the Schmitt trigger 38 and possibly in further amplifier circuits which are not shown for sake of simplicity. The trigger threshold must be adjusted so that the disk 18 will stop before that angular position corresponding to the correct position of the appropriate absorber sheet, i.e. so that, in fact, the motor 22 should continue its rotation for s short time to bring the absorber sheet to its desired position exactly.

In order to provide for this continued rotation, so as to bring disk 18 exactly into the desired position, there is fastened on intermediate shaft 28 a cam disk 44 carrying a cam 46 as the actuating member for a microswitch 48. As long as the cam disk has a position in which the cam 46 does not actuate micro switch 48, the latter is closed and, thus, connects the input of an amplifier 50 to a voltage source, a relay 52 being connected in the output circuit of the amplifier. Relay 52 actuates contact 52a, connecting the voltage of current source 55 to the terminals of the motor via a resistor 56 so that the motor will continue to rotate with reduced speed after opening of contact 42a. The position of cam disk 44 on intermediate shaft 28 is so designed that the cam 46 opens micro switch 48 in that instant in which one of the absorber sheets is exactly in the radiation path. In intermediate positions of disk 18, cam 46 may also open micro switch 48 during the rotation of intermediate shaft 28 because in this case, motor 22 is connected via closed contact 42a to full voltage. Thus, the speed ratio between disk 18 and intermediate shaft 28 may be chosen for example in to range 1 : 10 to 1 : 20. The threshold value of Schmitt trigger 38 or the value of the bridge voltage must be then chosen in such a manner that relay 42 will be disabled only if the respective absorber sheet is already almost in the desired position. Intermediate shaft 28 will then continue to rotate with reduced speed for a maximum of almost one full turn, the motor being completely stopped thereafter.

Instead of the cam 46, micro switch 48, amplifier 50, relay 52 and contact 52a, other switch components which are known per se can be used. It is, however, essential that the final position of disk 18 be mechanically predetermined and be influenced only by the actuation accuracy of contact 52a or of an equivalent component, but not by the position of the potentiometer tap slider or by the threshold value drift of Schmitt trigger circuit 38.

I claim:

1. In a thickness measuring device of the type having a radiation source for irradiating an object whose thickness is to be measured, a radiation detector for detecting the radiation transmitted by the irradiated object, radiation-absorbing means intended to be positioned in the radiation path and a positioning device for positioning this radiation-absorbing means in the radiation path, the positioning device comprising drive means for driving the radiation-absorbing means in order to change its position, means for generating an analog test signal representative of the position of the radiation-absorbing means, and means for generating an analog reference signal approximately representative of the desired position of the radiation-absorbing means;

the improvement comprising:

threshold switching means, controlled by the difference between the reference signal and the test signal, for actuating said drive means only when said difference exceeds the threshold of the threshold switching means to drive the radiation-absorbing means at a first, higher speed in the direction which reduces said difference, and fine switching means controlled by the position of the radiation-absorbing means for actuating said drive means when said difference is within said threshold to drive the radiation-absorbing means at a second, lower speed until the radiation-absorbing means reaches its predetermined desired position, and for stopping said drive means when said radiation-absorbing means reaches its predetermined desired position.

2. In a thickness measuring device of the type having a radiation source for irradiating an object whose thickness is to be measured, a radiation detector for detecting the radiation transmitted by the irradiated object, and radiation absorbing means intended to be positioned in the radiation path and further including a positioning device for positioning the radiation-absorbing means in the radiation path, comprising drive means for driving the radiation-absorbing means in order to change its position, means for generating an analog test signal representative of the position of the radiation-absorbing means, and means for generating an analog reference signal approximately representative of the desired position of the radiation-absorbing means;

the improvement comprising threshold switching means controlled by the difference between the reference signal and the test signal for actuating said drive means only when said difference exceeds the threshold of the threshold switching means to drive the radiation-absorbing means at a first, higher speed in the direction which reduces said difference, and fine switching means controlled by the position of the radiation-absorbing means for actuating said drive means when said difference is within said threshold to drive the radiation-absorbing means at a second, lower speed until the radiation-absorbing means reaches its predetermined desired position, and for stopping said drive means when said radiation-absorbing means reaches its predetermined desired position, and wherein said means for generating the analog test signal comprises two branches of a four-branch bridge circuit, said two branches being arranged potentiometrically with their junction point connected to said radiation-absorbing means for movement therewith; said means for generating the analog reference signal comprises the other two branches of the bridge circuit, which other two branches are also arranged potentiometrically, with their junction point being presettable for predetermining approximately the desired position of the radiation-absorbing means, and said threshold switch is connected across the diagonal of the bridge circuit.

3. A positioning device according to claim 2, wherein said threshold switching means comprises a Schmitt trigger controlled by the bridge diagonal voltage and a relay controlled by the Schmitt trigger and controlling the drive means.

4. In a thickness measuring device of the type having radiation source for irradiating an object whose thickness is to be measured, a radiation detector for detecting the radiation transmitted by the irradiated object, and radiation-absorbing means intended to be positioned in the radiation path, and further including a positioning device for positioning the radiation-absorbing means in the radiation path, comprising drive means for driving the radiation-absorbing means in order to change its position, means for generating an analog test signal representative of the position of the radiation-absorbing means, and means for generating an analog reference signal approximately representative of the desired position of the radiation-absorbing means;

wherein the improvement comprises threshold switching means controlled by the difference between the reference signal and the test signal for actuating said drive means, only when said difference exceeds the threshold of the threshold switching means to drive the radiation-absorbing means at a first, higher speed in the direction which reduces said difference, and fine switching means controlled by the position of the radiation-absorbing means for actuating said drive means when said difference is within said threshold to drive the radiation-absorbing means at a second, lower speed until the radiation-absorbing means reaches its predetermined desired position, and for stopping said drive means when said radiation-absorbing means reaches its predetermined desired position, and wherein said drive means include an electric motor and a first, higher, voltage source and a second, lower, voltage source, said threshold switching means actuating said drive means at the higher speed by connecting the motor to the higher voltage source and at the lower speed by connecting the motor to the lower voltage source.

5. A positioning device according to claim 1, wherein said drive means includes an intermediate shaft driven by a motor for transmitting rotary movement to the radiation-absorbing means, said intermediate shaft carrying an actuating member for controlling said fine switching means in accordance with the position of said radiation-absorbing means.

6. In a thickness measuring device of the type having a radiation source for irradiating an object whose thickness is to be measured, a radiation detector for detecting the radiation transmitted by the irradiated object, and radiation-absorbing means intended to be positioned in the radiation path and further including a positioning device for positioning the radiation-absorbing means in the radiation path comprising
drive means for driving the radiation-absorbing means in order to change its position,
means for generating an analog test signal representative of the position of the absorbing means
and means for generating an analog reference signal approximately representative of the desired position of the radiation-absorbing means;
the improvement comprising
threshold switching means controlled by the difference between the reference signal and the test signal for actuating said drive means, only when said difference exceeds the threshold of the threshold switching means to drive the radiation-absorbing means at a first, higher speed in the direction which reduces said difference, and
fine switching means controlled by the position of the radiation-absorbing means for actuating said drive means when said difference is within said threshold to drive the radiation-absorbing means at a second, lower speed until the radiation-absorbing means reaches its predetermined desired position, and for stopping said drive means when said radiation-absorbing means reaches its predetermined desired position, and wherein
said drive means includes an intermediate shaft driven by a motor for transmitting rotary movement to the radiation-absorbing means, said intermediate shaft carrying an actuating member for controlling said fine switching means in accordance with the position of said radiation-absorbing means, and
wherein said actuating member comprises a cam which operates said fine switching means to stop the drive means when said radiation-absorbing means reaches its predetermined position.

7. A thickness measuring device comprising:
a radiation source for irradiating an object whose thickness is to be measured,
a radiation detector for detecting the radiation transmitted by the object,
a disk having a plurality of radiation absorbers of different absorbing power disposed around its circumference, said disk being rotatable so that any one of the radiation absorbers can be brought into the radiation path,
an electric motor geared to the disk via an intermediate shaft, for driving the disk in rotation,
a four-branch bridge circuit having a voltage source across one diagonal,
this bridge circuit comprising two branches in the form of a potentiometer having an intermediate tap which divides the two branches, this intermediate tap being connected to the intermediate shaft so that the position of the intermediate tap is a function of the position of the disk,
the other two branches of the bridge circuit also being in the form of a potentiometer having an intermediate tap which divides them, the position of this latter intermediate tap being selectable to set approximately the desired position of the disk,
a Schmitt trigger controlled by the voltage across the other diagonal of the bridge circuit, said Schmitt trigger assuming a first state when this latter voltage exceeds a certain threshold and a second state when this voltage falls within the threshold,
a relay controlled by said Schmitt trigger for connecting said electric motor to a first, higher, voltage source when said Schmitt trigger is in its first state and for disconnecting said electric motor from said first higher voltage source when said Schmitt trigger is in its second state,
and a cam mounted on said intermediate shaft for operating a further switch which is normally in a first state, for putting it into a second state when the disk reaches its desired position, said further switch, in its first state, causing a further relay to connect said motor to a second, lower voltage, and in its second state, causing said further relay to disconnect said motor from said second lower voltage.

* * * * *